United States Patent [19]

Hirashima et al.

[11] Patent Number: 5,342,085
[45] Date of Patent: Aug. 30, 1994

[54] AIR BAG APPARATUS FOR AUTOMOTIVE VEHICLE

[75] Inventors: Isao Hirashima; Tetsuya Umeki; Hiroshi Maeta; Shigefumi Kohno, all of Hiroshima, Japan

[73] Assignee: Mazda Motor Corporation, Hiroshima, Japan

[21] Appl. No.: 809,444

[22] Filed: Dec. 19, 1991

[30] Foreign Application Priority Data

Dec. 19, 1990 [JP] Japan .............. 2-401056[U]
Jan. 31, 1991 [JP] Japan .............. 3-011294
Jan. 31, 1991 [JP] Japan .............. 3-011297

[51] Int. Cl.$^5$ ............................. B60R 21/20
[52] U.S. Cl. ................. 280/728 B; 280/732
[58] Field of Search ............. 280/728, 730, 732, 743, 280/753, 736, 742, 752, 728 R, 728 B

[56] References Cited

U.S. PATENT DOCUMENTS

| | | | |
|---|---|---|---|
| 4,893,833 | 1/1990 | DiSalvo | 280/728 |
| 4,964,653 | 10/1990 | Parker | 280/728 B |
| 5,018,762 | 5/1991 | Suzuki | 280/743 |
| 5,031,432 | 7/1991 | Frantom et al. | 280/737 |
| 5,035,444 | 7/1991 | Carter | 280/728 |
| 5,058,919 | 10/1991 | Paquette | 280/737 |
| 5,096,222 | 3/1992 | Komerska et al. | 280/732 |

FOREIGN PATENT DOCUMENTS 1-81154 5/1989 Japan .

*Primary Examiner*—Karin Tyson
*Attorney, Agent, or Firm*—Keck, Mahin & Cate

[57] ABSTRACT

A safety air bag apparatus is disposed behind an instrument panel having an instrument panel opening which is inclined with respect to a direction of air bag expansion relative to an opening of an air bag container. The safety air bag apparatus has a lid which covers the instrument panel opening so as to be flush with the instrument panel and to have an outer surface with a profile matching an outer profile of the instrument panel. The lid opens upwards to uncover the instrument panel opening. The safety air bag apparatus is further provided with a control device which brings the air bag, during expansion, into contact with a lower portion of the lid no later than it is brought into contact with an upper portion of the lid.

10 Claims, 6 Drawing Sheets

AIR BAG APPARATUS FOR AUTOMOTIVE VEHICLE

BACKGROUND OF THE INVENTION

1. Field of the Invention

This invention relates to a vehicle safety air bag apparatus and, more particularly, to an air bag apparatus for protecting a passenger seated in a front seat against injuries during front-end collisions.

2. Description of Related Art

For protecting a passenger seated in a front seat against injuries during a collision, a safety air bag apparatus is typically installed behind a dashboard in front of the passenger seat of the vehicle. An air bag apparatus of this kind has an air bag case, containing a folded air bag and an inflator or gas generator, which is closed by an air bag lid capable of opening upwards. The inflator generates a pressurized inert gas, and inflates and expands the folded air bag. During inflation and expansion of the air bag, the air bag applies pressure to the air bag lid so as to open it. This allows the air bag to expand in the vehicle interior or compartment so as to act as a cushion on the occupant of the front passenger seat.

Such a safety air bag apparatus is installed so as to provide a sufficient distance, or a sufficient space, between the air bag container and the occupant of the front passenger seat in order to prevent the occupant from being hit by an air bag lid during inflation and expansion of the air bag. This is particularly important if the occupant is a child standing close to the instrument panel of the vehicle. Also, the distance or space is important in order to assure that the occupant seated in the front passenger seat is contacted by the air bag after complete inflation of the air bag. When providing such a sufficient space between the air bag container and the occupant, the instrument panel structure is typically formed with a shelf which extends from an outer surface of an instrument panel toward the air bag container in a space inside the instrument panel structure.

For a desirable and aesthetically pleasing instrument panel structure appearance, the air bag lid is preferably flush with the instrument panel and has an outer surface with a profile matching the outer profile of the instrument panel. However, since the instrument panel inclines backwards and down relative to a direction in which the air bag expands, the expanding air bag first contacts an upper portion of the air bag lid, above the center of gravity of the air bag lid, if the air bag is hinged so as to open upwards. The typical air bag lid is thus unable to open lightly and smoothly, and opens somewhat sluggishly.

SUMMARY OF THE INVENTION

It is, therefore, an object of the present invention to provide a safety air bag apparatus which enables an air bag lid to open smoothly and lightly.

This object is accomplished by providing a safety air bag apparatus disposed behind an instrument panel of an automotive vehicle with an instrument panel opening which is inclined with respect to a direction of air bag expansion relative to an opening of an air bag container. The air bag container contains a folded air bag and gas generator means for generating a pressurized gas to inflate and expand the air bag into the automotive vehicle through the instrument panel opening upon a collision of the automotive vehicle. A lid, which is a part of the safety air bag apparatus, covers the instrument panel opening so as to be flush with the instrument panel. The lid has an outer surface with a profile matching an outer profile of the instrument panel. That is, the lid is inclined at an angle with respect to a direction of air bag expansion and is capable of opening upwards to uncover the instrument panel opening. The safety air bag apparatus is provided with a control means for bringing the air bag, during inflation and expansion of the air bag, into contact with a lower portion of the lid, which is the portion of the lid located below a laterally extending line passing through a center of gravity of the lid. This contact with the lower portion of the lid occurs no later than contact of the air bag with an upper portion of the lid, which is that portion of the lid located above the laterally extending line.

The control means comprises gas distribution control means which forms a pressurized gas pressure distribution pattern or a pressurized gas quantitative distribution pattern. Both of these distribution patterns correspond to an inclination of the lid relative to the air bag expansion direction so that the air bag applies an almost uniform pressure to the entire area of the lid.

The control means may alternately include a gas distribution control means for forming a pressurized gas pressure distribution pattern which is uniform in a direction perpendicular to the air bag expansion direction and a buffer means provided between the air bag and the lid for enabling the air bag, during inflation and expansion, to apply pressure to the lower portion of the lid faster than to the upper portion of the lid.

BRIEF DESCRIPTION OF THE DRAWINGS

The above and other objects and features of the present invention will be apparent to those skilled in the art from the following description of a preferred embodiment thereof when considered in conjunction with the accompanying drawings. In the drawings, similar reference numerals have been used to designate the same or similar elements throughout the drawings, and.

DETAILED DESCRIPTION OF THE PREFERRED EMBODIMENTS

Figure 1:
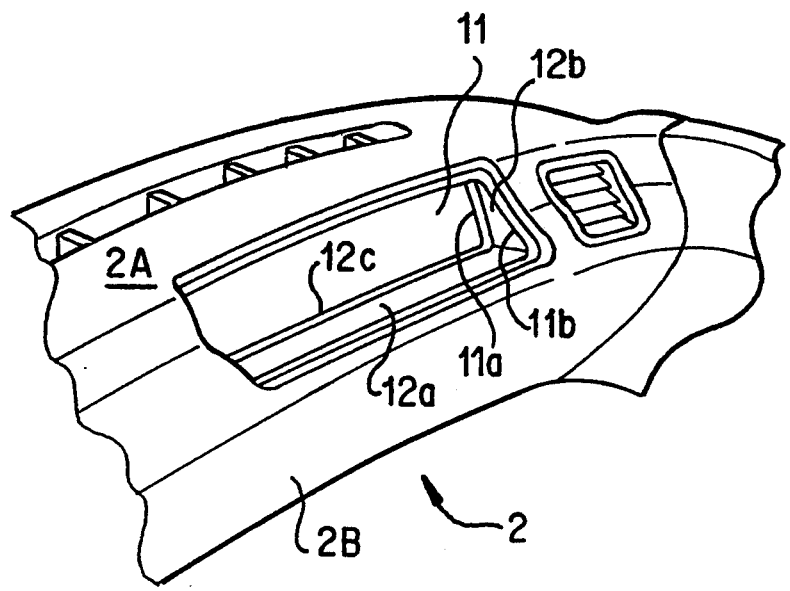
FIG. 1 is a schematic view of an interior of a front body section of a vehicle body in which an air bag apparatus, in accordance With a preferred embodiment of the present invention, is installed.

Referring to the drawings in detail and, in particular, to FIGS. 1–5, a safety air bag apparatus for an occupant of a front passenger seat in accordance with a preferred embodiment of the present invention, generally indicated by reference number 1A, is shown as installed behind a vehicle instrument panel 2. The instrument panel 2 has an upper portion 2A, extending substantially horizontally backwards from a front windshield (not shown), and a lower portion 2B, extending downward at an appropriate angle relative to the upper portion 2A. The instrument panel 2 comprises an inner or base instrument panel 2a and an outer or cover instrument panel 2b, between which a cushion 9d, formed from a material such as urethane, is filled. The air bag apparatus 1 includes a generally rectangular box-shaped air bag housing or container 3, which is installed behind the inclined portion of the instrument panel 2. The air bag container contains an inflator or gas generator 7 and a folded air bag 8. The air bag container 3 has an opening 3c through which the air bag 8 expands as it inflates. The opening 3c is parallel to a front surface of the air bag 8 which has been completely inflated and expanded. In this specification, the direction perpendicular to the front surface of the completely inflated and expanded air bag is referred to as a direction of air bag expansion (or an air bag expansion direction). The opening 3c of the air bag container 3 is placed at an acute angle relative to the lower portion 2B of the instrument panel 2 so as to form a space 4, having a triangular cross section, between the air bag container 3 and the instrument panel 2. A spacing between the opening 3c of the air bag container 3 and the instrument panel 2 gradually increases from a top to a bottom of the space 4. The air bag container 3 is provided with lower mounting brackets 3a projecting downward from its lower wall and is supported on a steering shaft holding member 6 having a high structural rigidity. The steering shaft holding member extends transversely with respect to the vehicle and is fixed in place by a fixing bracket 5 secured to the mounting brackets 3a. The safety air bag apparatus 1A further includes an air bag lid 9, having an outer surface with a profile matching the outer profile of the instrument panel 2. The air bag lid 9 comprises an inner lid panel or base lid panel 9a formed with a bracket 9b and an outer lid panel or cover lid panel 9e which are mechanically connected to each other so as to contain therebetween the cushion 9d. The air bag lid 9 is mounted for swinging movement on the air bag container 3 through a hinge member 10. The hinge member 10 is attached to an upper mounting bracket 3b of the air bag container 3 and the bracket 9b of the air bag lid 9.

As is shown in detail in FIG. 1, the instrument panel 2 is formed with a panel opening 11 which is defined by and between a front or inner opening 11a and a rear or outer opening 11b. The inner and outer openings 11a and 11b are connected to each other by a generally rectangular bottom shelf or partition wall 12a and a pair of generally triangular side partition walls 12b. All of these partition walls 12a and 12b are formed integrally with the base instrument panel 2a of the instrument panel 2. The outer opening 11b is formed in the outer surface of the instrument panel 2 that the outer surface of the air bag lid 9 is even with the outer surface of the cover instrument panel 2b of the instrument panel 2. Consequently, the air bag lid 9 is placed at an acute angle relative to the opening 3c of the air bag container 3. The inner opening 11a is formed at an acute angle relative to the outer opening 11b and parallel to the opening 3c of the air bag container 3. Between the base lid panel 9a and the cover lid panel 9e there is a cushioning material 9d. The fixing bracket 5 has a rear bracket extension 5a, which extends under the bottom partition wall 12a to form a double bottom structure for part of the panel opening 11. The panel opening 11 is formed with a flange 12c bent forwardly and inward from the front opening 11a.

Figure 3:
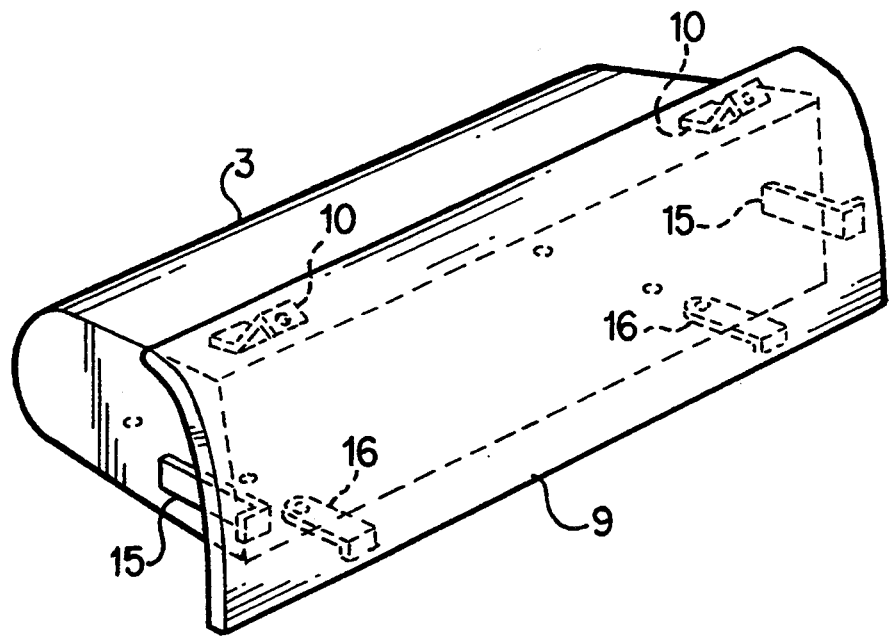
FIG. 3 is an enlarged perspective view showing an air bag container of the air bag apparatus of FIG. 2.

When the safety air bag apparatus 1A is installed in the vehicle, the air bag lid 9 is located in the outer opening 11b of the panel opening 11 of the instrument panel 2 and forms a part of the outer surface of the instrument panel 2. The opening 3c of the air bag container 3 matches the inner opening 11a surrounded by the flange 12c of the inner opening 11a of the panel opening 11. As is shown in FIG. 3, in order to position the air bag lid 9 so that the space 4 is maintained, the air bag container 3 is provided with a pair of side stoppers 15. Further, in order to prevent the air bag lid 9 from opening accidentally when the air bag 8 is not inflated, a pair of elastic bands 16 connects the air bag lid 9 and the air bag container 3. The elastic bands 16 can be torn by the air bag 8 during inflation and expansion. It is to be noted that the air bag lid 9, installed in the vehicle as a part of the safety air bag apparatus 1A, has a center of gravity P1 which is vertically displaced from a position closest to the air bag container 3.

Figure 4:
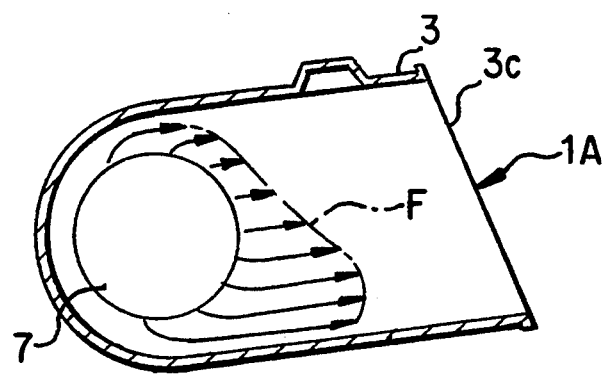
FIG. 4 is a schematic illustration showing a gas distribution pattern of gas generated from a gas generator.

As shown in FIG. 4, the gas generator 7, contained in the air bag container 3, generates a pressurized inert gas during a collision. The gas generator 7 is accompanied by a pressure distribution control means for providing a pressurized gas pressure distribution pattern corresponding to the inclination of the air bag lid 9 and, more specifically, of the base lid panel 9a of the air bag lid 9, so that when the air bag 8 is inflated by a pressurized gas distributed in such a distribution pattern F, the air bag 8 applies an almost uniform pressure to the air bag lid 9. In other words, due to the pressure distribution pattern F, the air bag 8, during inflation and expansion, is brought into contact with the base lid panel 9a of the air bag lid 9 with a pressure which is uniform over the whole area of the base lid panel 9a. Such a pressure distribution control means is well known in the art and may be of any known type.

In operation of the safety air bag apparatus 1A according to the present invention, when a collision occurs, the gas generator 7 is activated by a collision sensor (not shown), which may be of any type well known in the art. Consequently, a pressurized inert gas is rapidly directed, in the pressure distribution pattern shown in FIG. 4, into the air bag 8. This forces the air bag 8 through the space 4 defined between the inner and outer openings 11a and 11b of the panel opening 11, along the bottom partition wall 12a, toward the air bag lid 9, so that it applies pressure almost uniformly, as viewed in the vertical cross section, to the whole area of the base lid panel 9a of the air bag lid 9. When such pressure is applied to the air bag lid 9, the elastic bands 16 are torn, so that the air bag 8, while inflating and expanding, opens the air bag lid 9 upwards and is allowed to expand further into the vehicle compartment. The air bag 8 applies pressure uniformly over the whole area of the air bag lid 9, to not only to enable the air bag lid 9 to open smoothly but also to avoid applying a concentrated or local impact on the air bag lid 9. This contributes to structural integrity of the air bag lid 9.

It is to be understood that the gas generator 7 may be accompanied by a quantitative distribution control means for providing a pressurized gas quantitative distribution pattern corresponding to the inclination of the air bag lid 9 and, more specifically, of the base lid panel 9a of the air bag lid 9. Consequently, when the air bag 8 is inflated by a pressurized gas distributed in such a quantitative distribution pattern, the air bag 8 applies an almost uniform pressure to the air bag lid 9. Such a quantitative distribution control means is well known in the art and may be of any known type.

Figure 2:
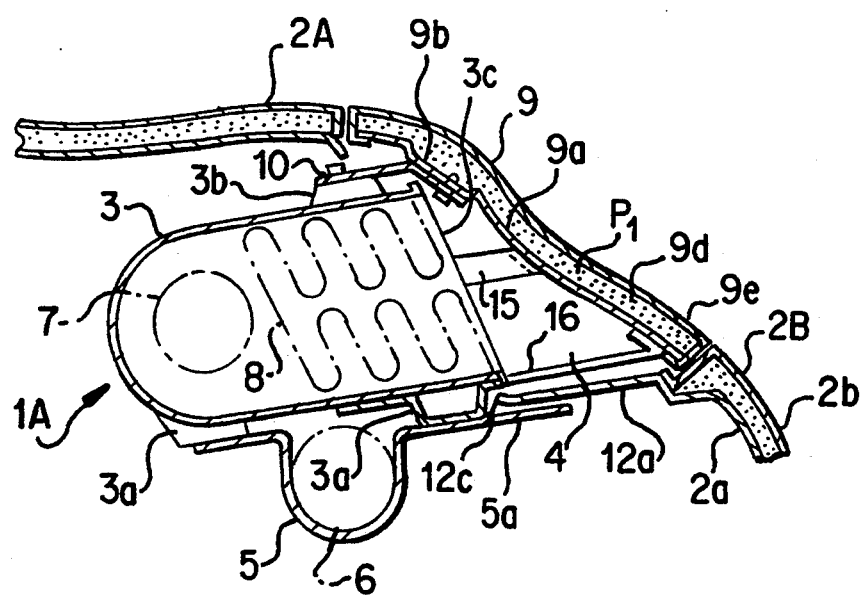
FIG. 2 is a cross-sectional view of FIG. 1.
Figure 5:
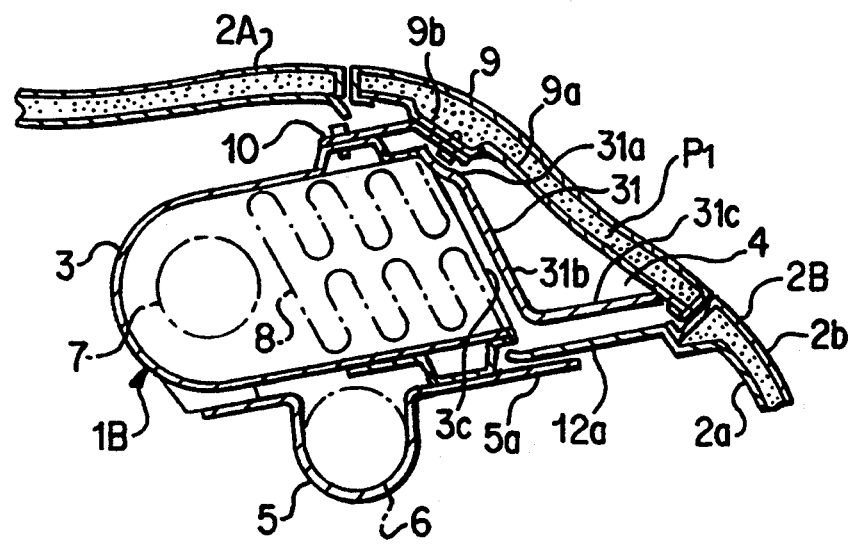
FIG. 5 is a cross-sectional view showing an air bag apparatus in accordance with another preferred embodiment of the present invention.
Figure 6:
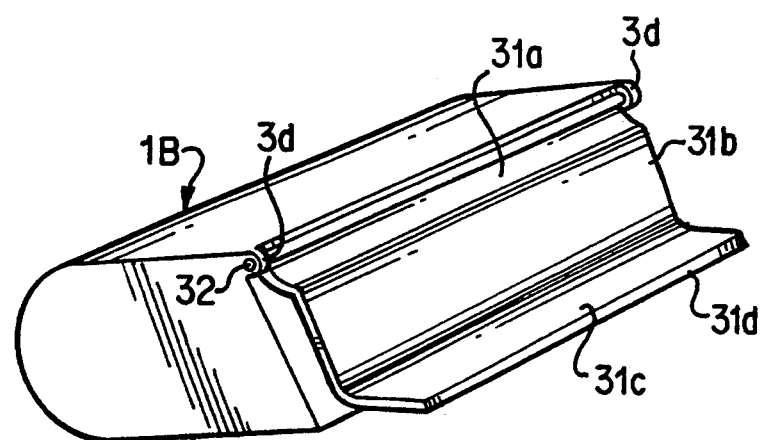
FIG. 6 is an enlarged perspective view showing an air bag container of the air bag apparatus of FIG. 5.

Referring to FIGS. 5 and 6 in conjunction with FIG. 2, a safety air bag apparatus 1B in accordance with another preferred embodiment of the present invention is shown. This embodiment has a buffer means in the forth of an extra inner air bag lid 31; this extra inner air bag lid is provided in addition to the air bag lid 9. Except for the inner air bag lid 31, the safety air bag apparatus is completely the same in structure as the safety air bag apparatus 1A of the previous embodiment shown in FIGS. 1 to 4. The inner air bag lid 31, which is mounted for upward swinging movement on a shaft 32, supported by side brackets 3d of an air bag container 3 and located between the air bag lid 9 and the air bag container 3, comprises three integral lid portions. These integral lid portions include an upper lid portion 31a, extending backward down from the shaft 32 at an acute angle with respect to a hypothetical plane in which an opening 3c of the air bag container 3 is placed, an intermediate lid portion 31b, extending downwards from the upper lid portion 31a and parallel to the hypothetical plane, and a lower lid portion 31c, extending backwards from the intermediate lid portion 31b and parallel to a bottom partition wall 12a of a mounting tunnel 11. The lower lid portion 31c of the inner air bag lid 31 has a free edge 31d abutting the base lid panel 9a of the air bag lid 9 at a position lower than the center of gravity P1. A gas generator 7, disposed in an air bag container 3, is accompanied by a pressure distribution control means for providing a pressurized gas pressure distribution pattern corresponding to the inclination of the inner air bag lid 31, and specifically the intermediate lid portion 31b of the inner air bag lid 31, which is almost parallel to the opening 3a of the air bag container 3. Consequently, when the air bag 8 is inflated by a pressurized gas distributed in such a distribution pattern, the air bag 8 applies a substantially uniform pressure to the inner air bag lid 31. Such a pressure distribution control means is well known in the art and may be of any known type.

In operation of the safety air bag apparatus 1B according to the present invention, when a collision occurs, the gas generator 7 is activated by a collision sensor (not shown), which may be of any type well known in the art. A pressurized inert gas is rapidly directed, under a uniform pressure distribution pattern, into the air bag 8. This forces the air bag 8 through the space 4 defined between the inner and outer openings 11a and 11b of the panel opening 11, along the bottom partition wall 12a, toward the inner air bag lid 31. The air bag is particularly directed to the intermediate lid portion 31b of the inner air bag lid 31 so that it applies pressure almost uniformly, as viewed in the vertical cross section, to the whole area of the intermediate lid portion 31b of the inner air bag lid 31. While the inner air bag lid 31 turns upwards about the shaft 32, it applies a pressure to the lower portion of the air bag lid 9 below the center of gravity P1. When such pressure is applied to the air bag lid 9, the elastic bands 16 are torn, so that the air bag 8, under inflation and expansion, forces the air bag lid 9 to open upwards and is allowed to expand into the vehicle compartment. Since the air bag 8 applies pressure substantially uniformly over the whole area of the inner air bag lid 31 and pushes the lower portion of the air bag lid 9, below the center of gravity P1, the force necessary to open the air bag lid 9 smoothly is small.

Figure 7:
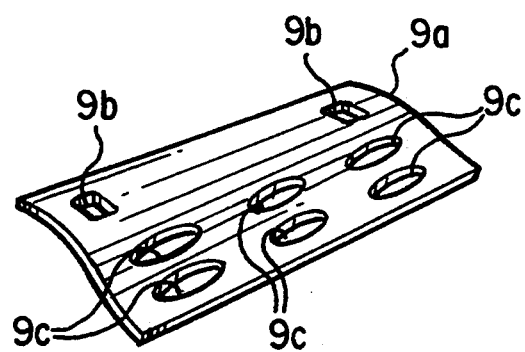
FIG. 7 is an enlarged perspective view showing a variation of an air bag lid of the air bag apparatus of FIG. 5.

In order to open the air bag lid 9 much more smoothly, the base lid panel 9a of the air bag lid 9 may be modified as shown in FIG. 7. That is, the base lid panel 9a is formed with a plurality of openings, such as elliptical holes 9c, distributed either regularly or irregularly in a lower portion of the base lid panel 9a, so as to shift the center of gravity P1 of the air bag lid 9 upwards as high as possible.

Figure 8:
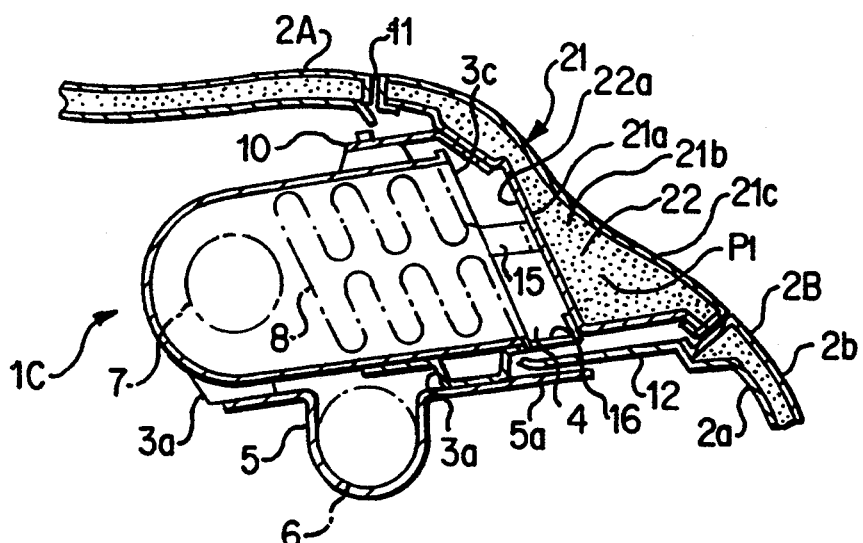
FIG. 8 is a cross-sectional view showing an air bag apparatus in accordance with still another preferred embodiment of the present invention.
Figure 9:
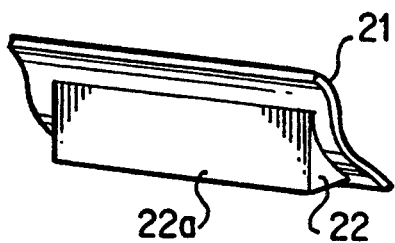
FIG. 9 is a perspective view showing an air bag lid of the air bag apparatus of FIG. 8.

Referring to FIGS. 8 and 9 in conjunction with FIG. 2, a safety air bag apparatus 1C in accordance with another preferred embodiment of the present invention is shown. In this embodiment, an air bag lid 21 is formed in a generally rectangular column 22 complementary to a space 4 in a panel opening 11 defined by a rectangular bottom partition wall 12a and a pair of triangular side partition walls 12b. The air bag lid 21 comprises a base lid panel 21a, which is placed parallel to an opening 3c of an air bag container 3, a cover lid panel 21c or an outer cover skin, which has an outer surface with a profile matching the outer profile of the instrument panel 2, and a cushioning material 21b, such as a formed urethane, filling the space between the base lid panel 21a and the cover lid panel 21c. A gas generator 7, disposed in an air bag container 3, generates an inert gas so that is pressurized uniformly as viewed in a vertical cross section.

In operation of the safety air bag apparatus 1C according to the present invention, the gas generator 7 is activated by a collision sensor (not shown), which may be of any type well known in the art, and a pressurized inert gas is rapidly directed, in a pressure distribution pattern which is uniform in vertical cross section, into the air bag 8. This forces the air bag 8 through the space 4 defined between the inner and outer openings 11a and 11b of the panel opening 11, along the bottom partition wall 12a, toward the air bag lid 21. The air bag is particularly directed to a flat outer surface 22a of the base lid panel 21a which is parallel to the opening 3c of the air bag container 3, so that it applies pressure almost uniformly, as viewed in the vertical cross section, to the whole area of the base lid panel 21a of the air bag lid 21. When such pressure is applied to the air bag lid 21, elastic bands 16 are torn, so that the air bag 8, under inflation and expansion, opens the air bag lid 21 upwards and is allowed to expand further into the vehicle compartment. The air bag 8 applies pressure uniformly over the whole area of the air bag lid 21. This not only enables the air bag lid 21 to open smoothly, but also to avoid applying impact locally on the air bag lid 21. This contributes to the structural integrity of the air bag lid 21.

Figure 10:
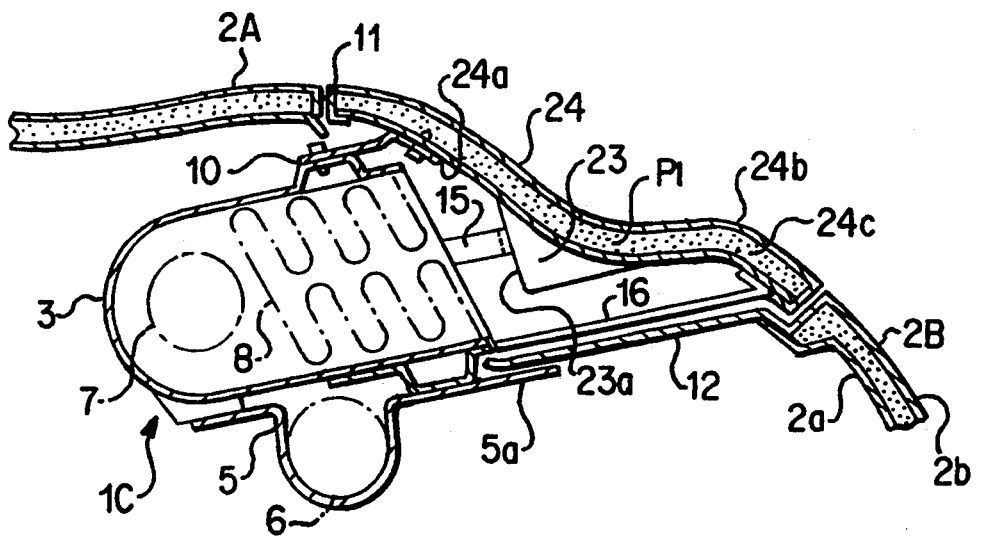
FIG. 10 is a cross-sectional view showing an air bag apparatus in accordance with a further preferred embodiment of the present invention.

The air bag lid 21 may be modified as shown in FIG. 10. That is, an air bag lid 24, which has an outer surface with a profile matching the outer profile of the instrument panel 2, comprises a base lid panel 24a and a cover lid panel 24b which are placed in parallel with each other. Between the base lid panel 24a and cover lid panel 24b, there is filled a cushioning material 24c. The air bag lid 24 is provided on the base lid panel with, on a buffer means, 23 a flat surface 23a extending over the transverse width of the opening of the air bag container 3. The flat surface 23a is formed integrally with a lower portion of the air bag lid 24 below a line which passes the center of gravity P1 of the air bag lid 24. The flat surface 23a is formed parallel to the opening 3c of the air bag container 3 or at a small acute angle relative to the air bag expansion direction.

Figure 11:
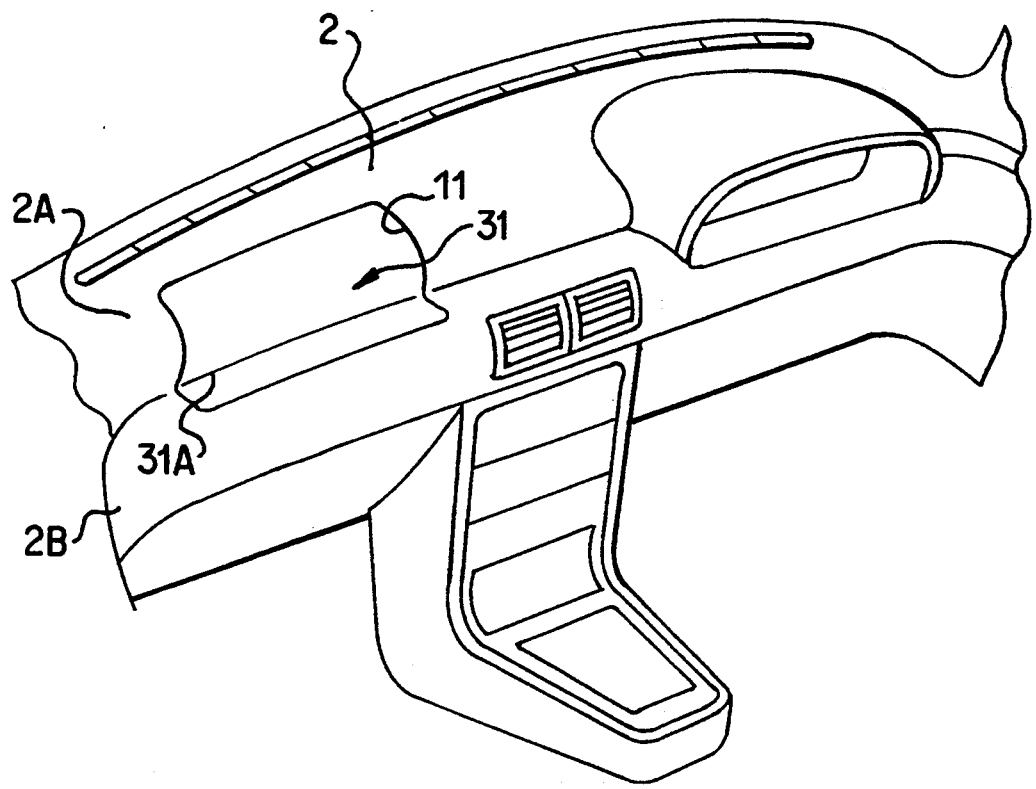
FIG. 11 is a schematic view of an interior of a front body section of a vehicle body in which an air bag apparatus, in accordance with a still further preferred embodiment of the present invention, is installed.
Figure 12:
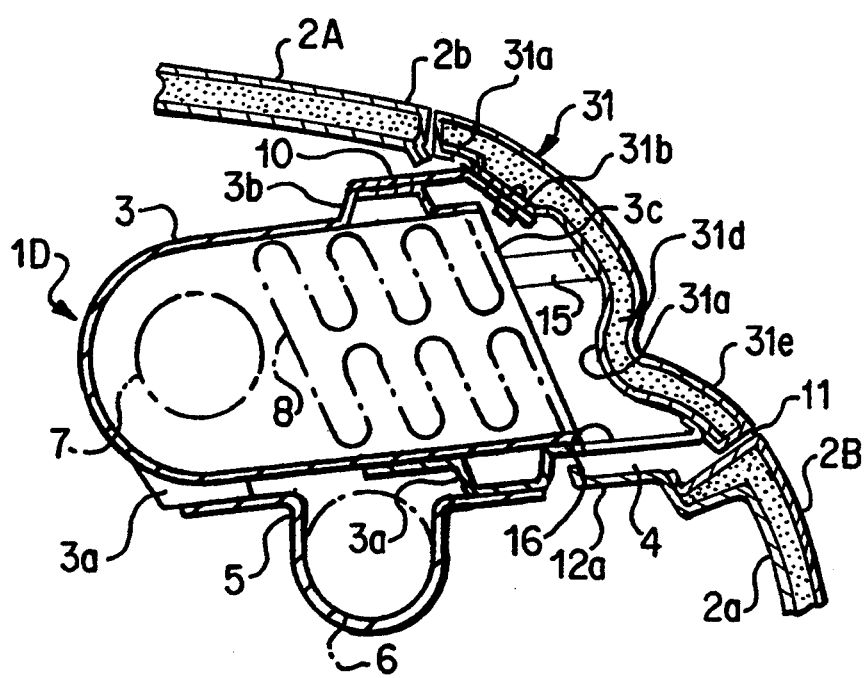
FIG. 12 is a cross-sectional view of FIG. 11.

Referring to FIGS. 11 and 12, a safety air bag apparatus for an occupant of a front passenger seat, generally indicated by a reference numeral 1D, in accordance with another preferred embodiment of the present invention is shown. This apparatus is installed behind a vehicle instrument panel 2. The instrument panel 2 has an upper panel portion 2A, which extends almost horizontally backward from a front windshield (not shown), and a lower panel portion 2B, integral with the upper panel portion 2A, which inclines downward at an appropriate angle relative to the upper portion 2A and in which a generally rectangular panel opening 11 is formed. The panel opening 11 has a lower side offset backward with respect to the vehicle relative to an upper side. The instrument panel 2 comprises an inner or base instrument panel 2a and an outer or cover instrument panel 2b. The air bag apparatus 1D includes a generally rectangular box-shaped air bag container 3 which is located at a certain distance from the lower side of the panel opening 11 behind the inclined panel portion 2B of the instrument panel 2 so as to match the panel opening 11 of the instrument panel 2. An inflator or gas generator 7 and a folded air bag 8 are provided in the air. The air bag container 3 has an aperture 3c, which is placed in a hypothetical plane disposed at an acute angle relative to the inclined lower portion 2B of the instrument panel 2 so as to form a space 4, triangular in cross section, between the air bag container 3 and the instrument panel 2. The lengthwise spacing between the aperture 3c of the air bag container 3 and the instrument panel 2 gradually increases from the top to the bottom of the space 4.

The air bag container 3 is provided with lower mounting brackets 3a projecting downward from its lower wall and is supported on a steering shaft holding member 6 having a high structural rigidity. The steering shaft holding member 6 extends transversely with respect to the vehicle, by the aid of a fixing bracket 5 secured to the mounting brackets 3a. The safety air bag apparatus 1D further includes an air bag lid 31 which is disposed in the panel opening 11 of the instrument panel 2 so as to be flush with the instrument panel 2 and to have an outer surface with a profile matching the outer profile of the instrument panel 2. The air bag lid 31 comprises an inner or base lid panel 31a, formed with a bracket 31b, and an outer or cover lid panel 31e. The lid panels are mechanically connected to each other so as to contain therebetween a cushion 31d formed of a material such as a foamed urethane. The air bag lid 31 is mounted for swinging movement on the air bag container 3 through a hinge member 10 attached to an upper mounting bracket 3b of the air bag container 3 and the bracket 31b of the air bag lid 31. The air bag lid 31 is formed at its middle portion with a transversely extending projection 31A extending convexly toward the air bag container 3 and concavely relative to the vehicle compartment. The projection 31A is desirably formed at a position as far below the middle portion of the air bag lid 31 as possible. The instrument panel 2 is provided with a generally rectangular shelf or partition wall 12a extending from the inclined lower portion 2B to the aperture 3c of the air bag container 3. The partition wall 12a is desirably formed integrally with the base instrument panel 2a, but may also be formed separately from the base instrument panel.

In the operation of the safety air bag apparatus 1D according to the present invention, the gas generator 7 is activated by a collision sensor (not shown), which may be of any type well known in the art. A pressurized inert gas is rapidly directed, in a pressure distribution pattern which is uniform in vertical cross section, into the air bag 8. This forces the air bag 8 through the space 4 along the bottom partition wall 12a, toward the air bag lid 31. The air bag is particularly formed toward the convex projection 31A of the air bag lid 31. When such pressure is applied to the air bag lid 31, the elastic bands 16 are torn, so that the air bag 8, as it inflates and expands, opens the air bag lid 31 upwards and expands further into the vehicle compartment. Since the air bag 8 applies pressure to the convex projection 31A, which is far from the hinged bracket 31b, the force necessary to open the air bag lid 9 smoothly is small.

Since the air bag lid 31 conceals the partition wall 12 and is flush with the upper and lower panel portions 2A and 2B, a smooth instrument panel profile of the instrument panel 2 is provided. Furthermore, the air bag container 3 is positioned a certain distance from the outer surface of the instrument panel 2, so as to provide a sufficient space which allows the air bag lid to open without hitting, for example, a child who may be standing in front of the instrument panel.

Figure 13:
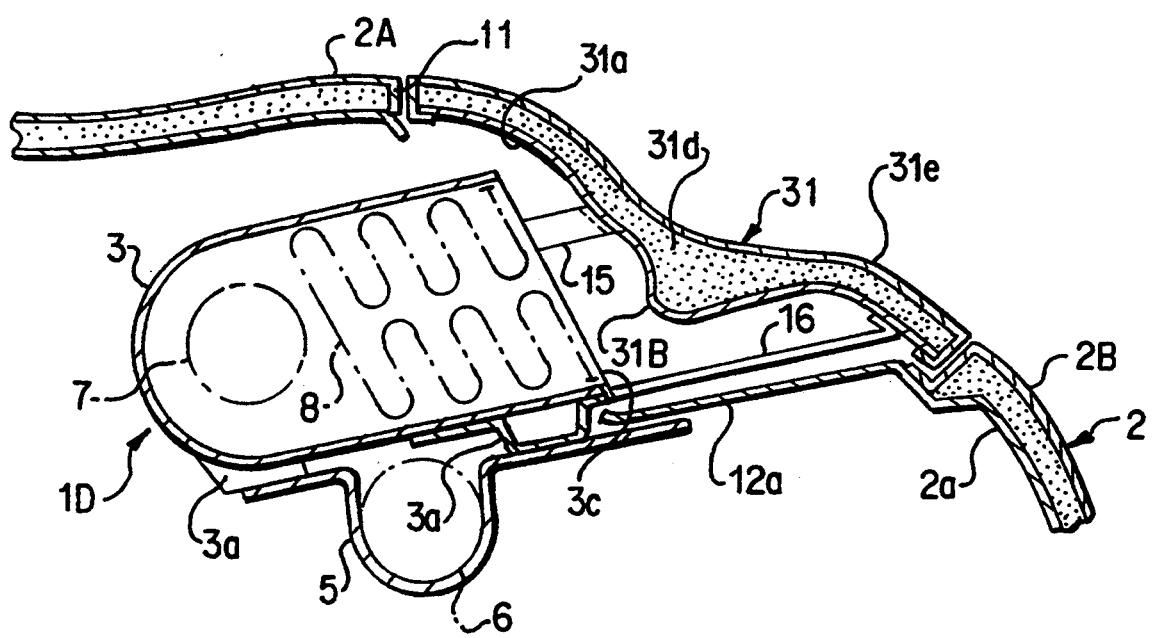
FIG. 13 is a cross-sectional view showing a variation of an air bag lid of the air bag apparatus of FIG. 11.

If the panel opening 11 is at a relatively large angle relative to the opening 3c of the air bag container 3 or at a relatively small angle relative to the air bag expansion direction and is shaped long and large, the air bag lid 31 is apt to bend under its own weight. In such a case, the air bag lid 31 may be modified as shown in FIG. 13 so that its structural rigidity is increased. That is, the air bag lid 31 can be provided with a transversely extending projection 31B, integrally formed with the base lid panel 31a, projecting convexly toward the air bag container 3 and a smoothly curved outer surface of the cover lid panel 31b. The projection 31B is desirably formed at a position far below the middle portion of the air bag lid 31 as possible.

It is to be understood that although the present invention has been described in detail with respect to preferred embodiments thereof, various other embodiments and variants may occur to those skilled in the art. Any such other embodiments and variants which fall within the scope of the invention are intended to be covered by the following claims.

What is claimed is:

1. In combination, an air bag apparatus for an automotive vehicle and an instrument panel having a panel opening behind which said air bag apparatus is disposed comprising:

an upper instrument panel portion extending substantially horizontally;

a lower instrument panel portion extending downward at an angle relative to said upper instrument panel portion, said instrument panel including a panel opening defined in a portion thereof between said upper instrument panel portion and said lower instrument panel portion;

an air bag disposed, when folded, behind the instrument panel;

gas generator means disposed behind the instrument panel for generating a pressurized gas to inflate said air bag;

an air bag container for housing said air bag and said gas generator means, said air bag container having an air bag container opening, said air bag expanding horizontally into the automotive vehicle through the air bag container opening and the panel opening when the automotive vehicle is subjected to a collision;

lid means for covering the panel opening, said lid means having an outer surface which is inclined with respect to both said upper instrument panel portion and said lower instrument panel portion and located therebetween, said lid means having a profile matching an outer profile of the instrument panel, said lid means being capable of opening upwards to uncover the panel opening;

at least one hinge member mounting said lid means on said air bag container for swinging movement; and gas distribution control means for (a) bringing said air bag, during inflation and expansion, into contact with a lower portion of said lid means disposed below a laterally extending line passing through a center of gravity of said lid means no later than it is brought into contact with an upper portion of said lid means disposed above said laterally extending line, (b) causing said air bag to apply a substantially uniform pressure over a whole inner surface area of said lid means and (c) pivoting said lid means upwards about the at least one hinge member.

2. A combination as recited in claim 1, wherein said gas distribution control means forms a pressurized gas pressure distribution pattern corresponding to an inclination of said lid means relative to a direction of air bag expansion.

3. A combination as recited in claim 1, wherein said gas distribution control means forms a pressurized gas quantitative distribution pattern corresponding to an inclination of said lid means relative to a direction of air bag expansion.

4. A combination as recited in claim 1, wherein said gas distribution control means forms a particular pressurized gas pressure distribution pattern and said lid means includes buffer means facing said air bag for enabling said air bag, during inflation and expansion, to apply pressure to said lower portion faster than said upper portion.

5. A combination as recited in claim 4, wherein said buffer means comprises a surface formed integrally with and behind said lower portion of said lid means, said surface being substantially parallel to said air bag container opening.

6. A combination as recited in claim 4, wherein said lid means comprises an external lid and an internal lid, said buffer means is formed by said internal lid faces said air bag, and said lid means opens upwards during inflation and expansion of said air bag, and said internal lid has a surface substantially parallel to said air bag container opening and is in contact with a lower portion of said external lid.

7. A combination as recited in claim 4, wherein said lid means comprises an external lid and an internal lid, said buffer means is formed by said internal lid, which is provided integrally with said external lid, and said internal lid has a surface substantially parallel to said air bag container opening.

8. A combination as recited in claim 6, wherein said at least one hinge member comprises a pair of hinge members, said air bag container comprises a pair of upper mounting brackets formed thereon, said external lid comprises a pair of brackets, and each of said pair of hinge members is attached to one of said upper mounting brackets and one of said brackets of said external lid.

9. A combination as recited in claim 8, wherein said air bag container further comprises a pair of side brackets formed thereon, said at least one hinge member further comprises a shaft supported between said side brackets, and said internal lid is hinged by said shaft to said air bag container.

10. A combination as recited in claim 1, wherein said at least one hinge member comprises a pair of hinge members, said air bag container comprises a pair of upper mounting brackets formed thereon, said lid means comprises a pair of brackets, and each of said pair of hinge members is attached to one of said upper mounting brackets and one of said brackets of said lid means.

* * * * *